(12) United States Patent
Shankar et al.

(10) Patent No.: US 7,412,625 B2
(45) Date of Patent: Aug. 12, 2008

(54) METHOD AND SYSTEM FOR REMOTE SOFTWARE DEBUGGING

(75) Inventors: Subramonian Shankar, Norcross, GA (US); Jason Andrew Messer, Loganville, GA (US)

(73) Assignee: American Megatrends, Inc., Norcross, GA (US)

( * ) Notice: Subject to any disclaimer, the term of this patent is extended or adjusted under 35 U.S.C. 154(b) by 515 days.

(21) Appl. No.: 10/446,044

(22) Filed: May 27, 2003

(65) Prior Publication Data

US 2004/0243883 A1 Dec. 2, 2004

(51) Int. Cl.
*G06F 11/00* (2006.01)
(52) U.S. Cl. ........................................................ 714/38
(58) Field of Classification Search ................ 714/38, 714/46, 57; 345/502, 530; 715/740, 749; 719/330
See application file for complete search history.

(56) References Cited

U.S. PATENT DOCUMENTS

| | | | | |
|---|---|---|---|---|
| 4,589,068 A | * | 5/1986 | Heinen, Jr. ................ 717/127 |
| 4,979,074 A | | 12/1990 | Morley et al. ............... 361/720 |
| 5,228,039 A | * | 7/1993 | Knoke et al. ................ 714/28 |
| 5,388,252 A | * | 2/1995 | Dreste et al. ................ 714/46 |
| 5,455,933 A | * | 10/1995 | Schieve et al. .............. 714/27 |
| 5,491,743 A | | 2/1996 | Shiio et al. .................. 709/204 |
| 5,615,331 A | | 3/1997 | Toorians et al. ........ 395/182.07 |
| 5,625,410 A | | 4/1997 | Washino et al. |
| 5,630,049 A | * | 5/1997 | Cardoza et al. ............. 714/25 |
| 5,732,212 A | | 3/1998 | Perholtz et al. ........ 395/200.11 |
| 5,777,874 A | | 7/1998 | Flood et al. ................. 700/82 |
| 5,815,653 A | * | 9/1998 | You et al. .................... 714/38 |
| 5,819,093 A | * | 10/1998 | Davidson et al. ........... 717/126 |
| 5,850,562 A | | 12/1998 | Crump et al. ............... 395/800 |
| 5,878,158 A | | 3/1999 | Ferris et al. |
| 5,953,451 A | | 9/1999 | Syeda-Mahmood |
| 5,990,852 A | | 11/1999 | Szamrej ...................... 345/2 |

(Continued)

OTHER PUBLICATIONS

American Megatrends AMIDiag User's Guide (Version 2.0), 2002. http://ami.com/support/doc/MAN-DIAG-WIN.pdf.*

(Continued)

*Primary Examiner*—Robert Beausoliel
*Assistant Examiner*—Elmira Mehrmanesh
(74) *Attorney, Agent, or Firm*—Hope Baldauff Hartman, LLC

(57) ABSTRACT

Systems and methods for debugging a computer program executing on a remote computer physically distant from a local computer are provided. The local and remote computers are connected via a network. The remote computer includes a redirection device operative to transmit the video output of the remote computer to the local computer via the network connection. The redirection device may also receive user input commands generated at the local computer and provide the input commands to the remote computer as if the input commands were physically generated by a user at the remote computer. The remote computer also includes a software program to be debugged and a debugger program. The local computer includes a remote control software application operative to receive and display the video output transmitted from the remote computer. The remote control application also receives user input commands, such as keyboard or mouse commands, received at the local computer and transmits the commands to the redirection device. The remote control application may be utilized to execute commands on the debugger application and to debug the software program executing on the remote computer from the local computer.

13 Claims, 7 Drawing Sheets

U.S. PATENT DOCUMENTS

| | | | |
|---|---|---|---|
| 6,011,920 A | 1/2000 | Edwards et al. | |
| 6,035,059 A | 3/2000 | Kurosawa et al. | |
| 6,054,676 A | 4/2000 | Wall et al. | 219/209 |
| 6,055,334 A | 4/2000 | Kato | |
| 6,065,072 A | 5/2000 | Flath | 710/29 |
| 6,119,247 A * | 9/2000 | House et al. | 714/38 |
| 6,124,811 A | 9/2000 | Acharya et al. | |
| 6,137,455 A | 10/2000 | Duo | 345/2 |
| 6,145,088 A * | 11/2000 | Stevens | 714/2 |
| 6,170,021 B1 * | 1/2001 | Graf | 710/15 |
| 6,219,695 B1 | 4/2001 | Guttag et al. | 709/217 |
| 6,243,743 B1 | 6/2001 | Freeny | 709/217 |
| 6,263,373 B1 | 7/2001 | Cromer et al. | |
| 6,272,562 B1 | 8/2001 | Scott et al. | 710/16 |
| 6,304,895 B1 | 10/2001 | Schneider et al. | 709/203 |
| 6,330,167 B1 | 12/2001 | Kobayashi | 361/818 |
| 6,360,250 B1 | 3/2002 | Anupam et al. | 709/204 |
| 6,377,461 B1 | 4/2002 | Ozmat et al. | 361/704 |
| 6,378,014 B1 | 4/2002 | Shirley | 710/100 |
| 6,397,256 B1 | 5/2002 | Chan et al. | 709/229 |
| 6,414,716 B1 | 7/2002 | Kawai | 348/211.3 |
| 6,434,003 B1 | 8/2002 | Roy et al. | 361/699 |
| 6,476,854 B1 | 11/2002 | Emerson et al. | 348/143 |
| 6,552,914 B1 | 4/2003 | Chang | |
| 6,560,641 B1 * | 5/2003 | Powderly et al. | 709/219 |
| 6,603,665 B1 | 8/2003 | Truong et al. | 361/752 |
| 6,609,034 B1 | 8/2003 | Behrens et al. | 700/19 |
| 6,636,929 B1 | 10/2003 | Frantz et al. | 710/313 |
| 6,651,120 B2 | 11/2003 | Chiba et al. | |
| 6,651,190 B1 * | 11/2003 | Worley et al. | 714/43 |
| 6,662,217 B1 * | 12/2003 | Godfrey et al. | 709/219 |
| 6,664,969 B1 | 12/2003 | Emerson et al. | 345/544 |
| 6,681,250 B1 | 1/2004 | Thomas et al. | 709/226 |
| 6,754,891 B1 * | 6/2004 | Snyder et al. | 717/128 |
| 6,816,963 B1 | 11/2004 | Krithivas et al. | |
| 6,820,267 B2 * | 11/2004 | Christensen et al. | 719/315 |
| 6,959,380 B2 | 10/2005 | Dake et al. | |
| 6,963,425 B1 | 11/2005 | Nair et al. | |
| 6,993,747 B1 | 1/2006 | Friedman | 717/124 |
| 7,039,229 B2 | 5/2006 | Lin et al. | |
| 7,165,041 B1 | 1/2007 | Guheen et al. | 705/26 |
| 7,231,606 B2 * | 6/2007 | Miller et al. | 715/738 |
| 7,299,463 B2 | 11/2007 | Brannock et al. | |
| 2001/0027465 A1 * | 10/2001 | Hammelbacher | 709/201 |
| 2001/0037366 A1 | 11/2001 | Webb et al. | 709/204 |
| 2002/0040418 A1 | 4/2002 | Bress et al. | 711/112 |
| 2002/0087949 A1 | 7/2002 | Golender et al. | 717/124 |
| 2002/0097234 A1 | 7/2002 | Sauber | 345/204 |
| 2002/0103882 A1 | 8/2002 | Johnston et al. | |
| 2002/0174415 A1 * | 11/2002 | Hines | 717/127 |
| 2002/0194403 A1 | 12/2002 | Pua et al. | 710/62 |
| 2002/0199035 A1 * | 12/2002 | Christensen et al. | 709/330 |
| 2003/0035049 A1 | 2/2003 | Dickens et al. | 348/100 |
| 2003/0058248 A1 | 3/2003 | Hochmuth et al. | 345/537 |
| 2003/0083842 A1 | 5/2003 | Miller et al. | 702/122 |
| 2003/0110244 A1 | 6/2003 | Mondale | 709/223 |
| 2003/0156132 A1 | 8/2003 | Gn et al. | |
| 2003/0177111 A1 | 9/2003 | Egendorf et al. | |
| 2003/0200273 A1 | 10/2003 | Khanna et al. | |
| 2003/0226015 A1 | 12/2003 | Neufeld et al. | |
| 2004/0059782 A1 | 3/2004 | Sivertsen | |
| 2004/0158614 A1 | 8/2004 | Williams | |
| 2004/0190773 A1 | 9/2004 | Messer et al. | 382/182 |
| 2004/0255276 A1 | 12/2004 | Rovang | 717/124 |
| 2005/0066000 A1 | 3/2005 | Liaw et al. | |
| 2005/0086670 A1 * | 4/2005 | Christensen et al. | 719/330 |
| 2006/0189900 A1 * | 8/2006 | Flaherty | 600/595 |
| 2006/0195042 A1 * | 8/2006 | Flaherty | 600/544 |

OTHER PUBLICATIONS

U.S. Appl. No. 10/016,484, filed Dec. 10, 2001, entitled "Systems and Methods for Capturing Screen Displays from a Host Computing System for Display at a Remote Terminal," Inventor: Umasankar Mondal.

U.S. Appl. No. 10/247,876, filed Sep. 20, 2002, entitled "Systems and Methods for Establishing Interaction Between a Local Computer and a Remote Computer." Inventor Clas Gerhard Sivertsen.

U.S. Appl. No. 10/790,160, filed Mar. 1, 2004, entitled "Method, System, and Apparatus for Communicating with a Computer Management Device." Inventor: Subash Kalbarga.

U.S. Appl. No. 10/867,348, filed Jun. 14, 2004, entitled "Housing for In-Line Video, Keyboard and Mouse Remote Management Unit." Inventor: Clas Gerhard Sivertsen.

U.S. Appl. No. 10/867,406, filed Jun. 14, 2004, entitled "In-Line Video, Keyboard and Mouse Remote Management Unit.." Inventor: Clas Gerhard Sivertsen.

U.S. Appl. No. 10/926,241, filed Aug. 25, 2004, entitled "Apparatus, Methods, and Systems for Redirecting Input and Output for Multiple Computers." Inventor: Clas Gerhard Sivertsen.

U.S. Appl. No. 10/966,221, filed Oct. 15, 2004, entitled "Systems and Methods for Capturing Screen Displays from a Host Computing System for Display at a Remote Terminal." Inventor: Umasankar Mondal.

Raritan Computer, Inc., "Raritan Announces New Paragon CIMs with Innovative DirectConnect Technology", a press release, Jan. 14, 2002, printed from www.raritan.com on Jan. 27, 2005.

"Z-Series information page" printout from Raritan website found at www.Raritan.com/products/kvm_switches/Z_series/prd_line. aspx. Printed Feb. 10, 2006.

U.S. Official Action dated Aug. 17, 2006 in U.S. Appl. No. 10/247,876.

U.S. Official Action dated Sep. 5, 2006 in U.S. Appl. No. 10/966,221.

U.S. Official Action dated Feb. 27, 2007 in U.S. Appl. No. 10/867,406.

U.S. Notice of Allowance and Allowability dated Nov. 1, 2007 in U.S. Appl. No. 10/462,509.

U.S. Appl. No. 10/875,641 entitled "Method and System for Remote Software Debugging," Inventor Stefano Righi and Eric Mills.

U.S. Official Action dated Aug. 10, 2007 in U.S. Appl. No. 10/867,406.

U.S. Official Action dated Jun. 29, 2007 in U.S. Appl. No. 10/462,509.

U.S. Official Action dated Mar. 6, 2007 in U.S. Appl. No. 10/462,509.

U.S. Official Action dated Sep. 11, 2006 in U.S. Appl. No. 10/462,509.

U.S. Official Action dated Mar. 6, 2007 in U.S. Appl. No. 10/403,198.

U.S. Official Action dated Sep. 19, 2006 in U.S. Appl. No. 10/403,198.

U.S. Notice of Allowance and Allowability dated Sep. 18, 2007 in U.S. Appl. No. 10/403,198.

U.S. Notice of Allowance and Allowability dated Nov. 10, 2004 in U.S. Appl. No. 10/867,348.

U.S. Notice of Allowance and Allowability dated Apr. 11, 2007 in U.S. Appl. No. 10/247,876.

U.S. Notice of Allowance and Allowability dated Jan. 5, 2007 in U.S. Appl. No. 10/966,221.

U.S. Notice of Allowance and Allowability dated Jul. 15, 2004 in U.S. Appl. No. 10/016,484.

U.S. Official Action dated Nov. 29, 2007 in U.S. Appl. No. 10/462,509.

U.S. Notice of Allowance and Allowability dated May 31, 2007 in U.S. Appl. No. 10/403,198.

U.S. Notice of Allowance and Allowability dated Jan. 11, 2008 in U.S. Appl. No. 10/403,198.

U.S. Official Action dated Aug. 13, 2003 in U.S. Appl. No. 10/016,484.

U.S. Official Action dated Mar. 8, 2004 in U.S. Appl. No. 10/016,484.

U.S. Official Action dated Jun. 22, 2004 in U.S. Appl. No. 10/016,484.

U.S. Official Action dated Feb. 23, 2004 in U.S. Appl. No. 10/247,876.
U.S. Official Action dated Aug. 3, 2004 in U.S. Appl. No. 10/247,876.
U.S. Official Action dated Feb. 3, 2005 in U.S. Appl. No. 10/247,876.
U.S. Official Action dated Aug. 8, 2005 in U.S. Appl. No. 10/247,876.
U.S. Official Action dated Feb. 24, 2006 in U.S. Appl. No. 10/247,876.
U.S. Official Action dated Dec. 17, 2007 in U.S. Appl. No. 10/790,160.
U.S. Official Action dated Dec. 27, 2007 in U.S. Appl. No. 10/867,406.
U.S. Official Action dated Jul. 27, 2007 in U.S. Appl. No. 10/875,641.
U.S. Official Action dated Jan. 10, 2008 in U.S. Appl. No. 10/875,641.
U.S. Official Action dated Apr. 18, 2006 in U.S. Appl. No. 10/966,221.
"Cable Allows Users to Extend DVI Connections," Jul. 31, 2001, *The Mac Observer*, printed from http://www.macobserver.com/article/2001/07/31.11.shtml, 4 pages.
"New KVM Switching System Controls 2,048 Servers Using Cat5 Cable" printout from Raritan website found at http://www.raritan.com/about/abt_press_detail.aspx?&status=4&articleId=127, printed May 23, 2006.
American Megatrends AMIDebug User's Guide (Veresion 2.0), 2002.
U.S. Notice of Allowance / Allowability dated May 13, 2008 in U.S. Appl. No. 10/403,198.
U.S. Official Action dated Jun. 3, 2008 in U.S. Appl. No. 10/875,641.

* cited by examiner

METHOD AND SYSTEM FOR REMOTE SOFTWARE DEBUGGING

TECHNICAL FIELD

Embodiments of the invention relate generally to the field of software debugging. More particularly, embodiments of the invention relate to the field of debugging software remotely.

BACKGROUND OF THE INVENTION

One of the most important parts of the software development process is the process of debugging. Debugging refers to the process of identifying and eliminating errors within a software program. A debugging application program, called a debugger, provides tools to assist a programmer in locating and correcting program errors. For instance, most debuggers provide tools for stepping through the executing code of a program, monitoring the status of input/output ports, and for monitoring and modifying the contents of memory locations and central processing unit registers.

Traditionally, a debugger must be run directly on the computer system that is executing the software that is being debugged. This, however, greatly hinders the software debugging process because the programmer performing the debugging must be in close proximity to the system being debugged. Other systems allow the debugging of one computer through another computer connected via a serial cable. However, these systems also require that the programmer be in relatively close proximity to the system being debugged. This may be extremely inconvenient when it is necessary to debug a computer system that is located across the country or even the world.

It is with respect to these considerations and others that the various embodiments of the present invention have been made.

SUMMARY OF THE INVENTION

In accordance with the present invention, the above and other problems are solved by methods and systems for remotely debugging a software program. These systems and methods make use of one or more operating system independent video and input/output redirection devices that allow remote control of the computer system from any network-connected location. By using such redirection devices, a computer system may be debugged from virtually anywhere in the world.

In accordance with other aspects, the present invention relates to a system for debugging a computer program executing on a computer (the "remote computer") located remotely from another computer (the "local computer"). The remote computer is connected to a network, such as a local area network ("LAN") or the Internet, and includes an operating system independent video and input/output redirection device (referred to herein as a "redirection device"). The redirection device is operative to transmit the video output of the remote computer to the local computer via the network connection.

The redirection device can also receive user input commands provided at the local computer and provide the input commands to the remote computer as if the input commands were physically generated by a user at the remote computer. In this manner, a user of the local computer can control the operation of the remote computer from a remote location, regardless of the type of operating system utilized by the remote computer.

The remote computer also includes a software program to be debugged, such as a basic input/output system ("BIOS"), and a debugger program. The local computer includes a remote control software application, such as a plug-in executing within a World Wide Web ("Web") browser, operative to receive and display the video output transmitted from the remote computer. The remote control application also receives user input commands, such as keyboard or mouse commands, received at the local computer and transmits the commands to the redirection device. In this manner, the remote control application may be utilized to execute commands on the debugger application and to debug the software program executing on the remote computer.

In accordance with other aspects, the invention relates to a method for debugging a computer program executing on a remote computer from a local computer. According to the method, the remote computer executes a computer program to be debugged and a debugger application. The video output of the remote computer, including the screen display generated by the debugger application, is transmitted to the remote computer. The video output of the remote computer, including the screen display generated by the debugger application, is then displayed at the local computer.

User input commands may be received at the local computer directed to the screen display generated by the debugger application. The user input commands are then transmitted from the local computer to the remote computer and executed at the remote computer to control the operation of the debugger application. The user input commands are executed at the remote computer as if the commands were physically generated at the remote computer by one or more input devices physically connected to the remote computer.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for remotely debugging a computer software program. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
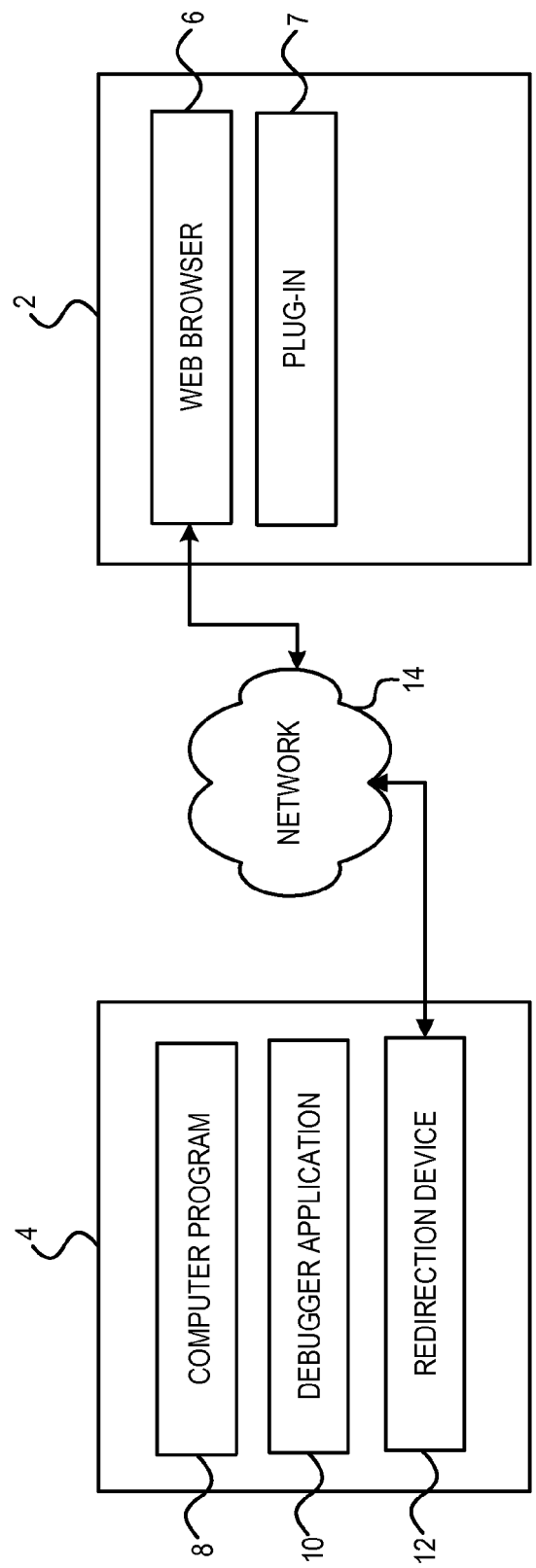
FIG. 1 illustrates a system for remotely debugging a computer program provided in one embodiment of the invention.
Figure 2:
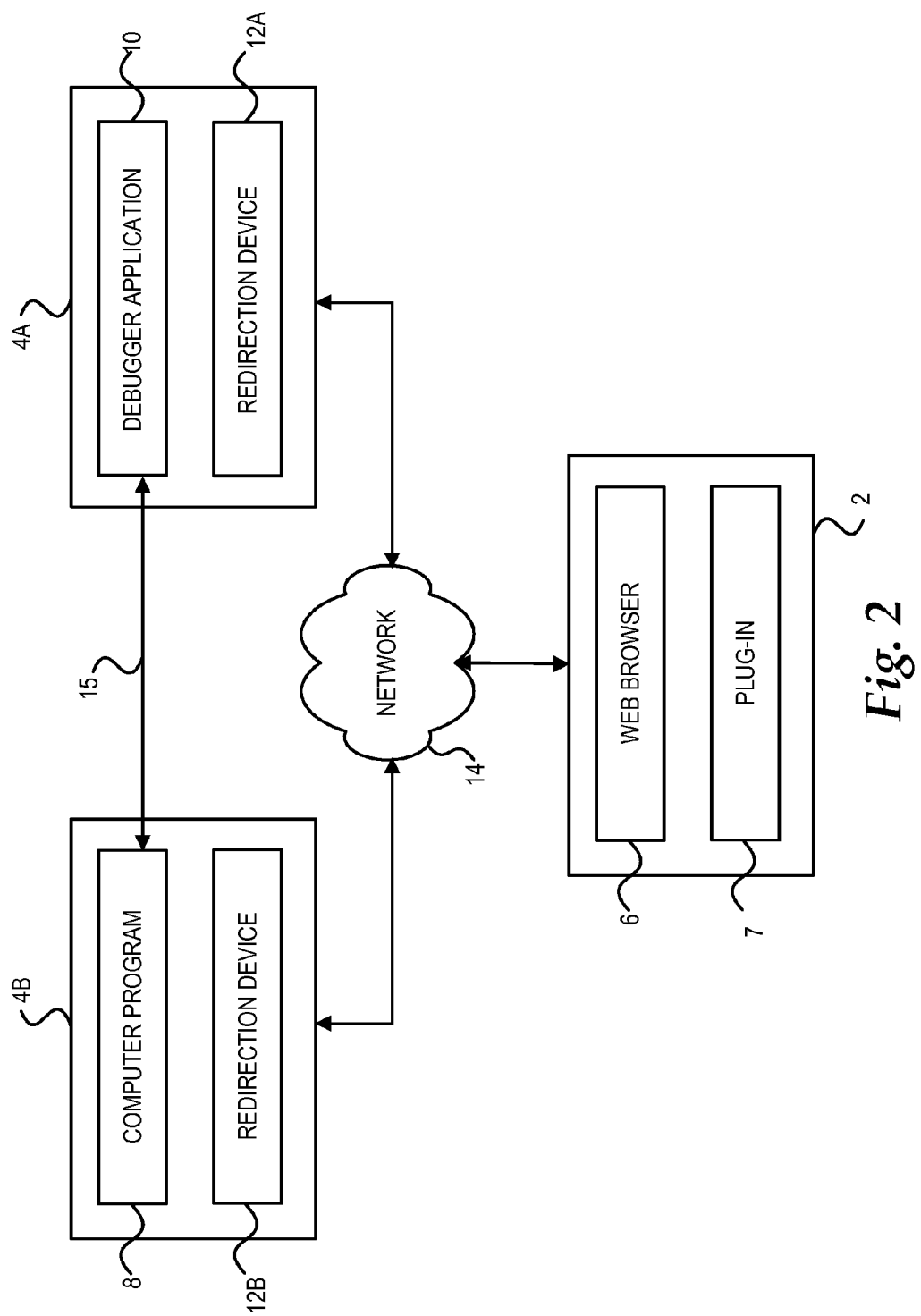
FIG. 2 shows a system for remotely debugging a computer program provided in another embodiment of the invention.

Referring now to the drawings, in which like numerals represent like elements through the several figures, aspects of the present invention and the exemplary operating environment will be described. FIGS. 1-2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a system for remotely debugging a computer program provided in one embodiment of the invention will be described. As shown in FIG. 1, the system includes a local computer 2. The local computer 2 comprises a standard personal or server computer operative to execute a Web browser application program 6, such as the INTERNET EXPLORER browser from MICROSOFT CORPORATION of Redmond, Wash. Alternatively, the local computer 2 may comprise another type of computing device operative to access a network 14, such as a personal digital assistant or other type of computer. The local computer 2 is also connected to a network 14, such as a LAN or the Internet. It should be appreciated, however, that the local computer 2 may be configured for communication over other types of distributed computing networks.

The local computer 2 also includes a plug-in 7 for use in conjunction with the Web browser 6. As known to those skilled in the art, plug-ins may be created utilizing ACTIVEX technology from MICROSOFT CORPORATION, JAVA from SUN MICROSYSTEMS, or other similar technologies from other vendors, that allow special functions to be performed within a Web browser. In particular, the plug-in 7 executes in conjunction with the Web browser 6 and communicates with a redirection device 12 operating in conjunction with a remote computer 4. As will be described in greater detail below, the plug-in 7 receives screen displays from the redirection device 12 and displays them at the local computer 2. The plug-in 7 also receives user input commands, such as mouse or keyboard commands, from a user of the local computer 2 and transmits these commands to the redirection device 12. The redirection device 12 may then provide the commands to remote computer 4, where they may be executed on the remote computer 4 as if they were physically received via an input device connected directly to the remote computer 4.

The remote computer 4 also comprises a standard desktop or server computer system. The remote computer 4 is connected to the network 14 and is operative to execute a debugger application 10. As described briefly above, the debugger application 10 provides facilities for assisting a programmer in locating and correcting program errors within a computer program, such as the computer program 8. For instance, a debugger application, such as the debugger application 10, typically provide tools for stepping through the executing code of a program, monitoring the status of input/output ports, and for monitoring and modifying the contents of memory locations and central processing unit registers.

The remote computer 4 also supports the use of an operating system independent video and input/output redirection device (referred to herein as a "redirection device"). The redirection device receives the video output of the remote computer 4 and compresses the video output for transmission to the plug-in 7 executing on the local computer 2. The redirection device then transmits the compressed video output of the remote computer 4 to the plug-in 7 executing on the local computer 2 via the network connection. The plug-in 7 is operative to decompress the data stream and to display the video output of the remote computer 4 on the local computer 2. The displayed output may include screen displays generated by the debugger application 10 and/or the computer program 8.

The plug-in 7 is also operative to receive user input commands, such as mouse or keyboard commands, generated at the local computer 2 and to transmit the commands to the redirection device 12. The redirection device 12 can receive the user input commands from the plug-in 7 and provide the input commands to the remote computer 4 as if the input commands were physically generated by a user at the remote computer 4. In order to provide this functionality, the redirection device 12 may be physically and electrically connected to the input ports of the remote computer 4 (serial, Universal Serial Bus ("USB"), etc.). The redirection device 12 may also provide connections for user input devices located at the remote computer 4 and may pass through signals received at the user input devices to the remote computer 4. In this manner, user input commands generated by a user physically located at the remote computer 4 may be passed through to the remote computer 4.

Moreover, through the use of the plug-in 7 and the redirection device 12, a user of the local computer 2 can control the operation of the remote computer 4 from a remote location. In particular, a user of the local computer 2 can utilize the debugger application 10 on the remote computer 4. The debugger application 10 can then be utilized to debug the computer program 8. According to one embodiment of the invention, the computer program 8 comprises a basic input/output system ("BIOS") utilized by the remote computer 4. However, the computer program 8 may comprise other types of computer programs, such as operating system programs, application programs, device drivers, and others.

It should be appreciated that the redirection device may comprise a device located internal to the remote computer 4 or an external device connected to the external connections of the remote computer 4. One example of an external redirection device comprises an external device that may be connected to the external video output of the remote computer 4, to the network 14, and to the user input devices located at the remote computer 4. Such a device is described in U.S. Pat. No. 7,260,624, entitled "Systems and Methods for Establishing Interaction Between A Local Computer and a Remote Computer", which is assigned to the assignee of the instant patent application and expressly incorporated herein.

Another embodiment may comprise a redirection device that is integrated with the mainboard of the remote computer 4 or contained on an adapter card within the remote computer 4. Such a device is described in U.S. Pat. No. 6,825,846, entitled "Systems and Methods for Capturing Screen Displays From A Host Computing System for Display At A Remote Terminal", which is also assigned to the assignee of the instant patent application and expressly incorporated herein. It should be appreciated that other types of redirection devices may also be utilized.

Referring now to FIG. 2, a system for remotely debugging a computer program provided in another actual embodiment of the invention will be described. As shown in FIG. 2, the system includes a local computer 2 and two remote computers 4A and 4B. As with the system described above, the local computer 2 comprises a standard personal or server computer operative to execute a Web browser application program 6 and a plug-in 7. The local computer 2 is also connected to a network 14, such as a LAN or the Internet, and may be configured for communication over other types of distributed computing networks.

The local computer 2 also includes a plug-in 7 for use in conjunction with the Web browser 6. In particular, the plug-in 7 executes in conjunction with the Web browser 6 and communicates with a redirection device 12A operating in conjunction with a remote computer 4A. As in the system described above, the plug-in 7 receives screen displays from the redirection device 12A and displays them at the local computer 2. The plug-in 7 also receives user input commands, such as mouse or keyboard commands, from a user of the local computer 2 and transmits these commands to the redirection device 12A. The redirection device 12A may then provide the commands to remote computer 4A, where they may be executed on the remote computer 4A as if they were physically received via an input device connected directly to the remote computer 4A. Multiple instances of the Web browser 6 and the plug-in 7 may be utilized on the local computer 2 to communicate with other redirection devices, such as the redirection device 12B utilized by the remote computer 4B.

The remote computers 4A and 4B also comprises standard desktop or server computer systems. The remote computer 4A is connected to the network 14 and is operative to execute a debugger application 10. As described briefly above, the debugger application 10 provides facilities for assisting a programmer in locating and correcting program errors within a computer program, such as the computer program 8, executing on the remote computer 4B. In particular, the computer program 8 includes functionality for communicating with the debugger application over the communications link 15.

As shown in FIG. 2, the remote computers 4A and 4B include redirection devices 12A and 12B, respectively. As discussed above, the redirection devices 12A and 12B, allow a user of the local computer 2 to control the operation of the remote computers 4A and 4B from a remote location. In particular, a first instance of the Web browser 6 and the plug-in 7 may be utilized on the local computer 2 to view the screen output of the remote computer 4A, including screen displays generated by the debugger application 10, and to interact with the debugger application 10 executing on the remote computer 4A. Another instance of the Web browser 6 and the plug-in 7 may be utilized on the local computer 2 to view the screen output of the remote computer 4B, including screen displays generated by the computer program 8, and to interact with the computer program 8 executing on the remote computer 4B. In this manner, a user of the local computer 2 can debug the computer program 8 utilizing the debugger application 10.

According to one embodiment of the invention, the computer program 8 comprises a BIOS utilized by the remote computer 4B. The BIOS is configured to communicate with the debugger application 10 and to provide information regarding the execution of the BIOS. This information is transmitted from the computer program 8 to the debugger application 10 via the communications link 15. It should also be appreciated that the computer program 8 may be debugged utilizing the debugger application 10 without the use of the redirection device 12B at the remote computer 4B.

Figure 3:
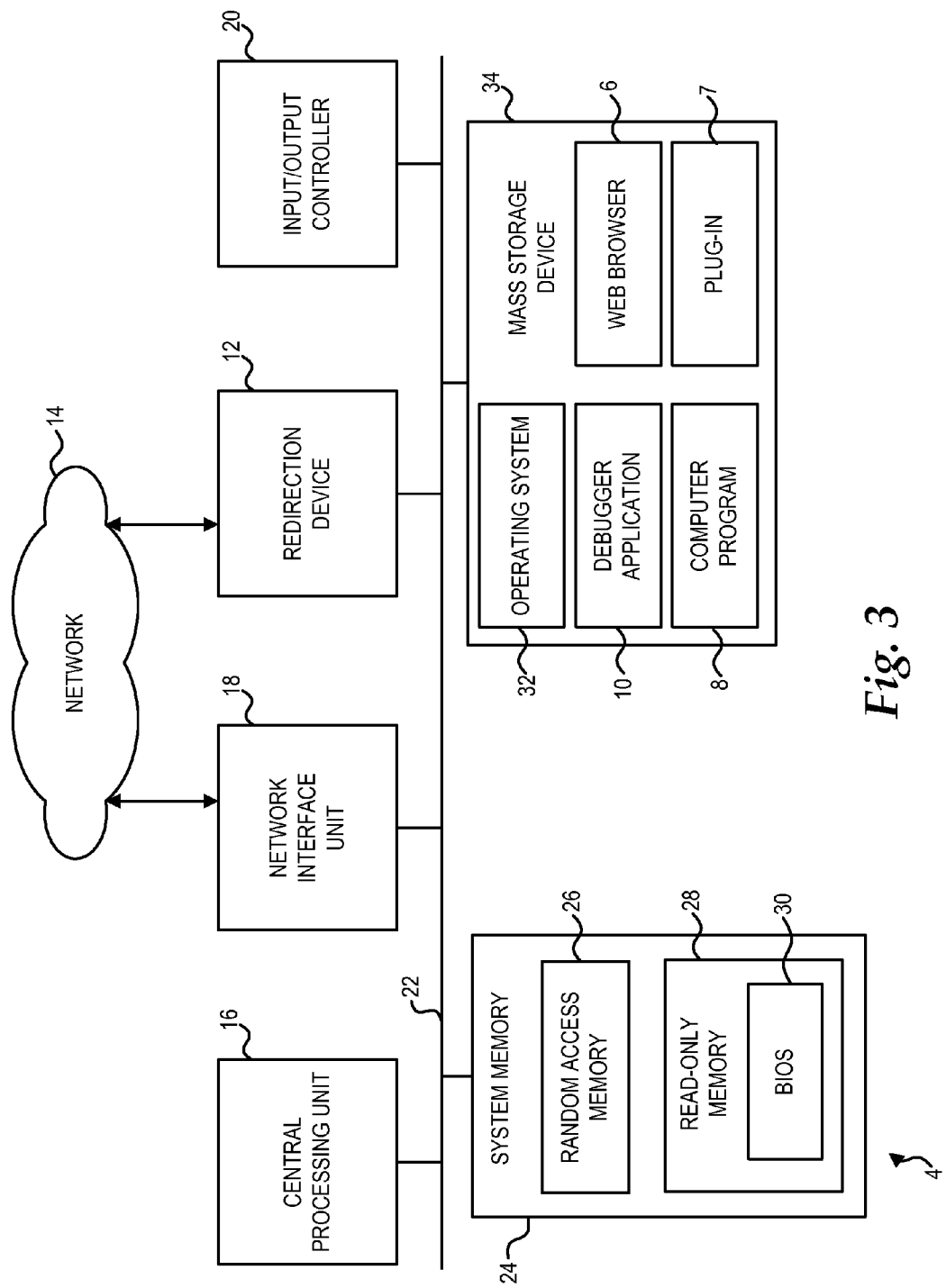
FIG. 3 illustrates a computer architecture for a computer system utilized in the various embodiments of the invention.

Referring now to FIG. 3, an illustrative computer architecture for a computer 4 for practicing the various embodiments of the invention will be described. The computer architecture shown in FIG. 3 illustrates a conventional server or personal computer, including a central processing unit 16 ("CPU"), a system memory 24, including a random access memory 26 ("RAM") and a read-only memory ("ROM") 28, and a system bus 22 that couples the memory to the CPU 16. A basic input/output system 30 containing the basic routines that help to transfer information between elements within the computer, such as during startup, is stored in the ROM 28. The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 also stores application programs, such as the debugger application 10, the computer program 8, the Web browser 6 and plug-in 7, and data.

The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 3). Similarly, an input/output controller 20 may provide output to a display screen, a printer, or other type of output device.

The computer 4 also includes a redirection device 12. As described above, the redirection device may be internal or external to the computer 4. The redirection device receives and compresses the video output of the computer 4 for transmission over the network 14. The redirection device 12 also transmits the compressed screen displays to a plug-in 7 executing on a remotely located computer, where the data may be decompressed and displayed. Because the redirection device 12 is implemented in hardware, operation of the redirection device 12 is not dependent on the execution of a particular type of operating system 32. Moreover, because the redirection device 12 is implemented in hardware, the operating system 32 does not have to be loaded by the computer 4 for the screen displays of the computer 4 to be compressed and transmitted. In this manner, the computer 4 may be remotely controlled immediately after it is powered on and without the need to load any operating system.

As discussed briefly above, the redirection device also includes input/output ports for connecting peripheral input devices that would otherwise be connected to the computer 4. In particular, a mouse and keyboard (not shown in FIG. 3) may be directly connected to the redirection device 12. Input commands received by these devices may then be passed by the redirection device 12 to the input/output controller 20. Additionally, user input commands may also be received by the plug-in 7 at a remote computer. These commands are transmitted by the plug-in 7 to the redirection device 12. The remotely generated commands are also passed from the redirection device 12 to the input/output controller 20 for execution on the computer 4 as if the commands were generated locally. In this manner, the operation of the computer 4 may be completely controlled from a remote computer.

Figure 4:
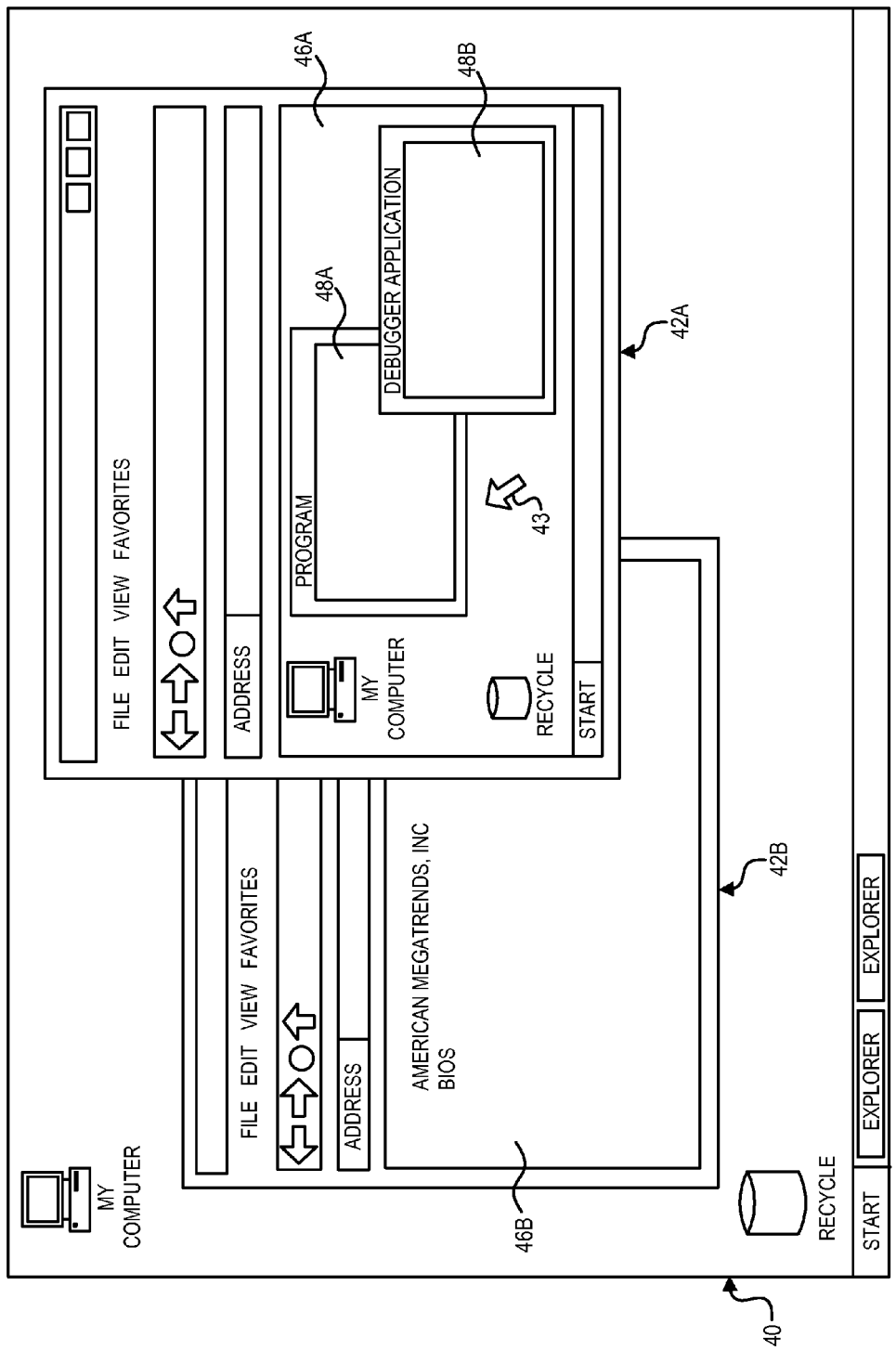
FIG. 4 shows a screen display produced by a computer system provided in one embodiment of the invention.

Turning now to FIG. 4, an illustrative screen display 40 provided by a local computer 2 will be described. The screen display 40 shows an illustrative screen display provided by a computer 2 executing the MICROSOFT WINDOWS XP operating system and communicating with two remote computers 4A and 4B. In particular, the screen display 40 shows a first user interface window 42A generated by the MICROSOFT INTERNET EXPLORER Web browser executing a plug-in 7 and connected to a remote computer 4A. The user interface window 42A includes the entire screen display generated by the remote computer 4A, including the user interface desktop 46A, a user interface window 48A generated by a computer program executing on the remote computer 4A, and a user interface window 48B generated by the debugger application 10. As described above, the screen display shown in the window 42A is compressed by the redirection device 12A and transmitted to the local computer 2, where it is displayed. Additionally, a user may interact with and perform commands on the window 42A, such as with the mouse cursor 43. These commands are received by the plug-in 7 and transmitted to the redirection device 12A for execution on the remote computer 4A.

The user interface window 42B includes a screen display generated by the computer program 8 executing on the remote computer 4B. In particular, as shown in FIG. 4, the user interface window 42B includes a screen display generated by a BIOS executing on the remote computer 4B. By using the user interface windows 42A and 42B, a user of the local computer 2 can utilize the debugger application 10 and its window 48B to debug the BIOS executing on the remote computer 4B. It should be appreciated that more than two instances of the Web browser 6 and plug-in 7 may be utilized to simultaneously remote control any number of computers equipped with redirection devices. It should also be appreciated that the user interface windows 42A and 42B may be maximized to encompass the entire display screen. In this manner, the display shown at the local computer 2 would be identical to that generated at the remote computer 4.

Figure 5:
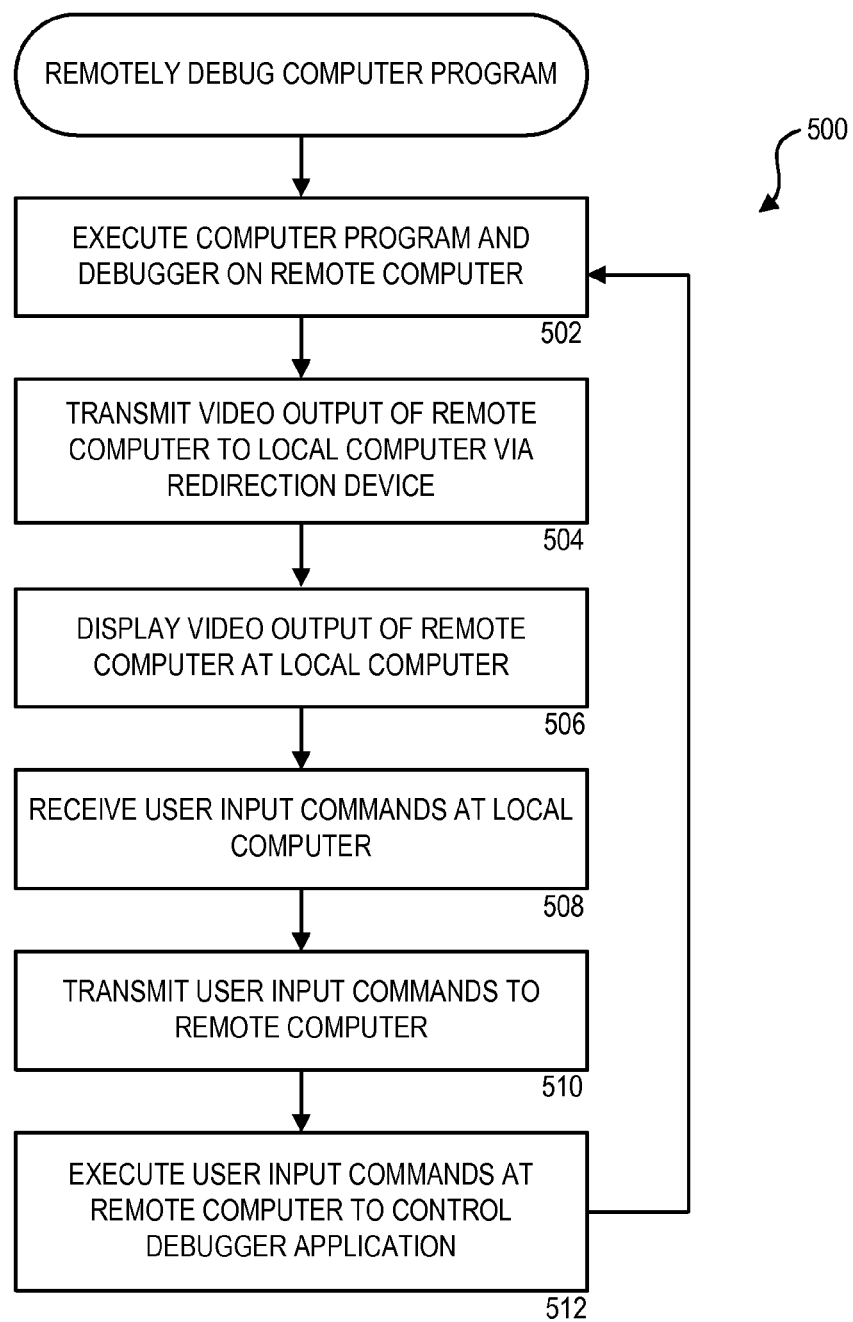
FIG. 5 illustrates an operational flow for remotely debugging a computer program utilized in one embodiment of the invention.

Turning now to FIGS. 1 and 5, an illustrative routine 500 will be described for controlling the operation of the system for remotely debugging a software program according to one embodiment of the invention. The routine 500 begins at block 502, where the remote computer 4 executes the computer program 8 and the debugger application 10. From block 504, the routine 500 continues to block 504, where the compressed video output of the remote computer 4 is transmitted to the plug-in 7 by the redirection device 12. At block 506, the plug-in 7 receives the compressed video output and displays the output on the local computer 2 in a window or full screen. It should be appreciated that the redirection device 12 and the plug-in 7 perform the transmitting and displaying functions, respectively, in a continual manner so that an updated video display is continually displayed at the local computer 2.

From block 506, the routine 500 continues to block 508, where user input commands are received at the local computer 2 that are directed to the display of the remote computer 4. The commands are received by the plug-in 7 and are transmitted to the redirection device 12 at block 510. The commands may then be passed by the redirection device 12 to the remote computer 4 for execution at the remote computer 4 as if the commands were received at input devices physically connected to the remote computer 4 at block 512. In particular, user input commands may be received at the local computer 2 directed to screen displays generated by the debugger application 10. The user interface commands may then be passed to the remote computer 4 and executed on the debugger application 10 as if the commands were generated by a user located physically proximate to the remote computer 4. In this manner, the debugger application 10 may be utilized to debug the computer program 8 from a remote location. From block 512, the routine 500 returns to block 502, where the above-described process repeats.

Figure 6A:
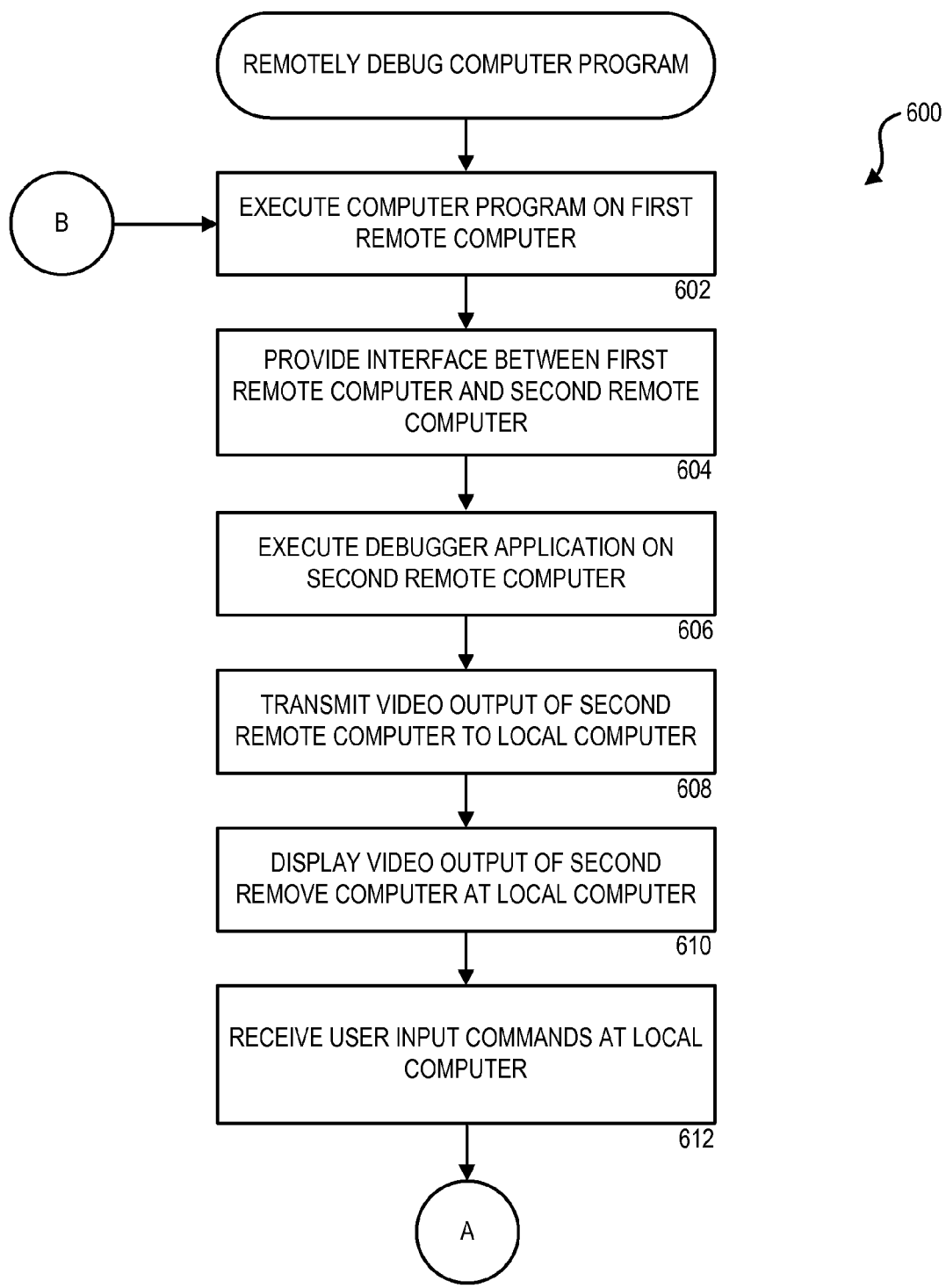
FIG. 6A-6B illustrate an operational flow for remotely debugging a computer program utilized in another embodiment of the invention.
Figure 6B:
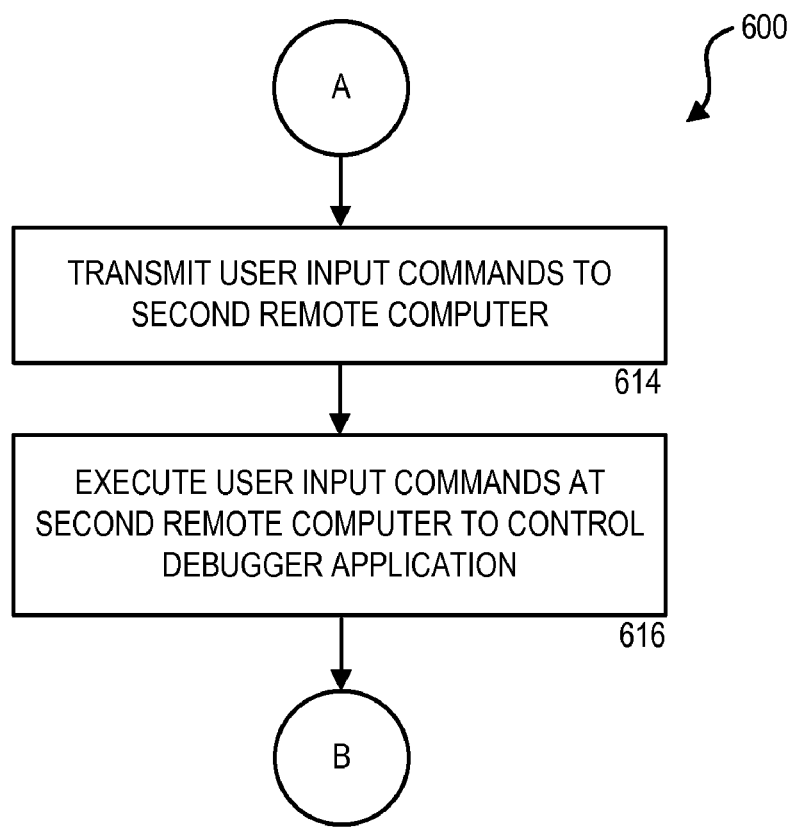

Referring now to FIGS. 2 and 6A-6B, an illustrative routine 600 will be described for controlling the operation of the system for remotely debugging a software program according to another embodiment of the invention. The routine 600 begins at block 602, where the computer program is executed on the remote computer 4B. The routine 600 then continues to block 604, where the communications link 15 is provided between the remote computers 4A and 4B. As described above, the communications link 15 allows the debugger application 10 to communicate with the computer program 8.

From block 604, the routine 600 continues to block 606 where the debugger application is executed on the remote computer 4A. The routine 600 continues to block 608, where the compressed video output of the remote computer 4A is transmitted by the redirection device 12A to one instance of the plug-in 7 executing on the local computer 2. The compressed video output is received by the plug-in 7 and displayed at the local computer 2 at block 610. The compressed video output of the remote computer 4B may also be transmitted to an instance of the plug-in 7 by the redirection device 12B. The video output of the remote computer 4B may then be displayed at the local computer 2, including any screen displays generated by the computer program 8. Similarly, user input commands directed toward the screen display provided by the remote computer 4B may be received at the local computer 2 and transmitted to the redirection device 12B. These commands may then be passed to the computer 4B by the redirection device 12B and executed on the application program 8 as if they were generated by user input devices connected directly to the remote computer 4B.

From block 610, the routine 600 continues to block 612, where user input is received at the local computer 2 intended for the remote computer 4A. The user input commands are then transmitted by the plug-in 7 to the redirection device 12A for execution on the remote computer 4A. At block 616, the user input commands are passed to the remote computer 4A from the redirection device 12A, where the commands are executed by the remote computer 4A as if they were received at user input devices physically connected to the remote computer 4A. In particular, the commands may be utilized to control the operation of the debugger application 10 for use in debugging the computer program 8. From block 616, the routine 600 returns to block 602.

Based on the foregoing, it should be appreciated that the various embodiments of the invention provide methods and systems for remotely debugging a software program. The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for debugging a computer program executing on a first computer from a third computer, the system comprising:
   the first computer operative to execute the computer program;
   a second computer having a connection to the first computer and operative to execute a debugger application capable of providing functionality for debugging the computer program executing on the first computer over the connection, the second computer comprising an operating system independent video and input/output redirection device operative to transmit video output of the second computer to the third computer, to receive user input commands transmitted from the third computer, and to provide the input commands to the second computer as if the input commands were physically generated at the second computer; and
   the third computer operative to execute a software application for receiving the video output of the second computer, for displaying the video output of the second computer, for receiving user input commands directed toward the displayed video output of the second computer, and for transmitting the user input commands to the operating system independent video and input/output redirection device of the second computer, the user input commands from the third computer directed to the debugger application executing on the second computer to control debugging of the computer program executing on the first computer.

2. The system of claim 1, wherein the input/output redirection device is operative to transmit the video output of the second computer to the third computer as data capable of being displayed in a Web browser application, and wherein the software application comprises a Web browser application.

3. The system of claim 2, wherein the video output of the second computer includes a screen display generated by the debugger application.

4. The system of claim 1, wherein the first and second computers are physically located at a different location than the third computer, and wherein the second computer and the third computer are connected via a communications network.

5. The system of claim 1, wherein the computer program executing on the first computer comprises a basic input output system for controlling at least a portion of the operation of the first computer.

6. The system of claim 1, wherein the first computer further comprises an operating system independent video and input/output redirection device operative to transmit video output of the first computer to the third computer, to receive user input commands transmitted from the third computer, and to provide the input commands from the third computer to the first computer as if the input commands were physically generated at the first computer.

7. The system of claim 6, wherein the third computer is further operative to execute a software application for receiving the video output of the first computer and for displaying the video output of the first computer.

8. The system of claim 7, wherein the third computer is further operative to receive user input commands directed toward the displayed video output of the first computer and to transmit the user input commands from the third computer to the operating system independent video and input/output redirection device of the first computer.

9. A method for debugging a computer program executing on a first computer from a remotely located third computer, the method comprising:
   executing on the first computer the computer program;
   providing an interface between the first computer and a second computer;
   executing on the second computer a debugger application, the debugger application operative to provide functionality to assist in debugging the computer program executing on the first computer over the interface;
   transmitting video output of the second computer to the third computer, the video output including a screen display generated by the debugger application;
   displaying the video output of the second computer at the third computer;
   receiving user input commands at the third computer, the user input commands directed toward the screen display generated by the debugger application executing on the second computer;
   transmitting the user input commands from the third computer to the second computer; and
   executing the user input commands from the third computer at the second computer to control the debugger application executing on the second computer for debugging the computer program executing on the first computer as if the user input commands were physically generated at the second computer.

10. The method of claim 9, wherein transmitting the video output of the second computer to the third computer comprises transmitting the video output of the second computer to the third computer in a format displayable within a Web browser application, and wherein displaying the video output of the second computer at the third computer comprises displaying the video output of the second computer at the third computer within a Web browser application.

11. The method of claim 9, further comprising:

transmitting video output of the first computer to the third computer; and displaying the video output of the first computer at the third computer.

12. The method of claim 9, wherein the computer program executing on the first computer comprises a basic input output system for controlling at least a portion of the operation of the first computer.

13. The method of claim 11, further comprising:

receiving user input commands at the third computer directed toward the displayed video output of the first computer; and transmitting the user input commands to the first computer for execution on the first computer.

* * * * *